United States Patent

Marten

[11] 3,830,162
[45] Aug. 20, 1974

[54] SWITCHING ARRANGEMENT FOR A CONVEYANCE BOUND TO A GUIDE STRUCTURE SUCH AS A SUSPENSION RAILWAY OR THE LIKE

[75] Inventor: Fritz Marten, Erlangen, Germany

[73] Assignee: Siemens Aktiengesellschaft, Munich, Germany

[22] Filed: Oct. 2, 1972

[21] Appl. No.: 294,211

[30] Foreign Application Priority Data
Mar. 30, 1972  Germany............................ 2215807

[52] U.S. Cl.................................. 104/105, 104/130
[51] Int. Cl............................................ E01b 25/12
[58] Field of Search...... 104/96, 105, 130, 148 LM, 104/148 MS, 148 SS

[56] References Cited
UNITED STATES PATENTS
3,500,765  3/1970  Easton................................ 104/130
3,628,462  12/1971  Holt..................................... 104/130
3,702,099  11/1972  Ricaud................................ 104/148 LM Primary Examiner—M. Henson Wood, Jr.
Assistant Examiner—D. W. Keen
Attorney, Agent, or Firm—Kenyon & Kenyon Reilly Carr & Chapin

[57] ABSTRACT

A switching arrangement for a conveyance bound to a guide structure such as a suspension railway or the like is disclosed. The conveyance can include a vehicle equipped with at least one track wheel having a central guide flange. The track wheel then travels along a track of the guide structure. The switching arrangement includes a switch in the guide structure for branching at least one additional track into a main track. Magnets are arranged at the track and act selectively on two armature plates which are arranged at the vehicle on both sides of the track wheel. Depending on whether the one or the other armature plate is placed into the area of the magnet flux, a directing force in the one or the other direction is produced.

16 Claims, 7 Drawing Figures

SWITCHING ARRANGEMENT FOR A CONVEYANCE BOUND TO A GUIDE STRUCTURE SUCH AS A SUSPENSION RAILWAY OR THE LIKE

BACKGROUND OF THE INVENTION

The invention relates to a conveyance bound to a guide structure such as a suspension railway or the like. More particularly, the invention relates to such a railway wherein the vehicle is equipped with at least one track wheel with rolling surfaces situated on both sides of a central rim. The guide structure includes two rails that correspond to the respective rolling surfaces of the wheel.

In railways with such track wheels, the switches present problems. Although mechanical switches with switchable tongues are possible, they are subject to considerable wear and, in the case of passenger cabin-type railways, do not permit trains to be closely spaced because of the relatively long switching time.

A study by the firm Demag entitled: Kabinentaxi, ein neues Verkehrssystem, March 1971, Sheet A4.13 discloses how a wheel can be guided in the area of the switch by forces acting from the track, for example forces developed by magnets, in such a manner that the desired track is always followed. Further details are, however, not available from this publication.

SUMMARY OF THE INVENTION

It is an object of the invention to provide a switching arrangement for a conveyance bound to a guide structure of the type mentioned above. Subsidiary to this object, it is an object of the invention to provide such a switching arrangement which can be traversed safely and switched rapidly.

The switching arrangement of the invention is for a conveyance bound to a guide structure such as a suspension railway or the like. The conveyance can include a vehicle equipped with at least one track wheel having rolling surfaces mutually adjacent a center guide flange, and the guide structure can have two rails conjointly defining a main track for accommodating respective ones of the rolling surfaces of the track wheel.

The switching arrangement of the invention includes as a feature, a switch in the guide structure for branching at least one additional track into the main track. First and second armature members are mounted on the vehicle so as to be selectively movable respectively into and out of respective regions. First magnet means and second magnet means are provided for generating respective magnetic fields at these regions respectively to individually coact with corresponding ones of the armature members in dependence upon the presence of the armature members in the regions respectively.

According to a further feature of the invention, the armature members are arranged on the vehicle so as to place these regions at both respective sides of the plane of the track wheel, and the first and second magnet means are disposed with respect to the vehicle at the guide structure in the vicinity of the switch on the outer sides respectively of the rails of the main track so as to coact with corresponding ones of the armature members near the track wheel of the vehicle. The armature members can be configured as plate-like members.

The switching arrangement of the invention thus affords the capability of obtaining a directing force in the vicinity of a switch by moving an armature plate into the region of influence of a magnet; this directing force is obtained without the need for stationary switchable parts for the desired direction. Successive cabins, one following the other, can thus be prepared for the desired travel direction before the switch is reached, so that vehicles can be conducted through the area of the switch with close spacing and different travel directions. Maintenance is thereby simplified considerably.

Although the invention is illustrated and described herein as a switching arrangement for a conveyance bound to a guide structure such as a suspension railway or the like, it is nevertheless not intended to be limited to the details shown, since various modifications may be made therein within the scope and the range of the claims. The invention, however, together with additional objects and advantages will be best understood from the following description and in connection with the accompanying drawings.

DESCRIPTION OF THE PREFERRED EMBODIMENTS OF THE INVENTION

Figure 1:
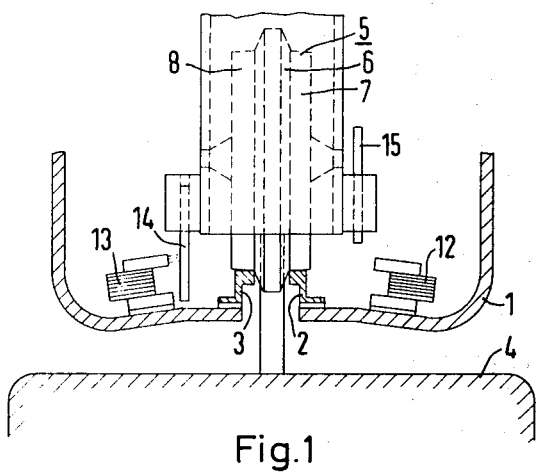
FIG. 1 is an elevation view, partially in section, of a suspension railway equipped with a switching arrangement according to the invention; this view is taken at the switching arrangement as a vehicle of the conveyance passes thereover.

Referring to FIG. 1, the guide structure is designated with reference numeral 1 on which rails 2 and 3 are arranged. The vehicle 4 has at least one track wheel 5 with rolling surfaces 7 and 8 arranged on respective sides of a central guide flange 6; these surfaces are in contact with respective rails 2 and 3.

Figure 2:
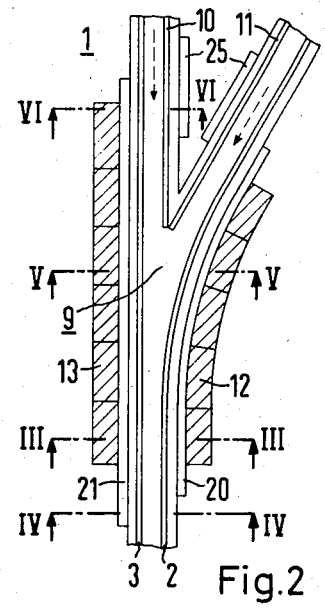
FIG. 2 is plan view of the guide structure illustrating the switching arrangement.

As is shown in FIG. 2, the rail 2 leads to a branch guide structure in the area of a switch 9, while the rail 3 extends in the direction of the main guide structure. The rails 10 and 11 form part of the main guide structure and the branch guide structure respectively after the switch 9 so that the tracks can continue as rail pairs. The rails 3 and 2 conjointly define a main track up to the switch 9 and rails 3 and 10 conjointly define the main track after the switch 9. A branch track extending from the switch is conjointly defined by rails 11 and 2.

Figure 5:
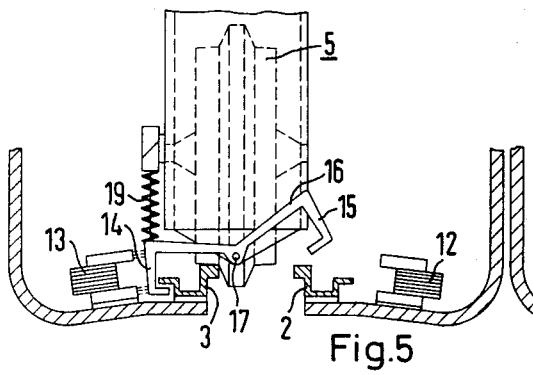

The switching arrangement according to the invention includes first magnet means and second magnet means in the form of magnets 12 and 13 respectively; these magnets are associated with the vehicle 4 on the track 1 in the area of the switch 9 and are disposed on the outer sides of the rails 2 and 3 respectively. As shown in FIG. 1, the magnets 12 and 13 act selectively on the two armature members constituted by plates 14 and 15 which are arranged on respective sides in the vicinity of the track wheel 5. These armature plates are arranged at the vehicle 4 so that they can be placed into or out of the region of the magnetic flux of the magnet 12 or 13. If the armature plate 14 is placed into the region of the magnetic flux of the magnet 13, a force acting on the vehicle 4 in lateral direction is produced which guides the track wheel 5 of the vehicle 4 on the rail 3 which is associated with the operative magnet 13 (FIG. 5). An armature plate 14 or 15 can be put into place on the vehicle, before it reaches the switch, by mechanical, electrical, hydraulic or pneumatic means.

The magnets 12 and 13 can be configured as permanent magnets or more advantageously, as continuously excited electromagnets.

It is preferable to arrange the armature plates 14,15 so that the force of the magnets 12,13 on the armature plates 14,15 is exerted at the elevation of the surface of the corresponding rail 2 or 3, and/or 10 or 11, respectively. Additional tilting moments on the vehicle 4 are thereby avoided.

Figure 3:
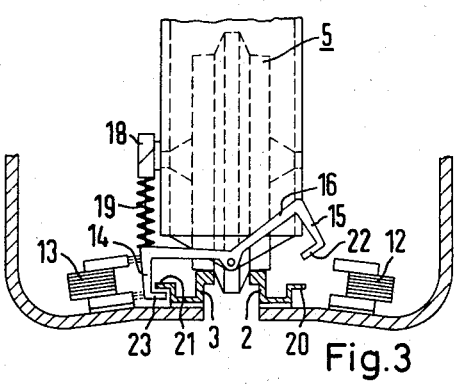

It is particularly advantageous to attach the armature plates 14,15 which are arranged on both sides of the rails 2,3 at a rocker arm 16 (FIG. 3). The pivot shaft 17 of the rocker arm 16 is disposed parallel to the rails 2,3 in the center plane of the track. In this manner, a self-acting mechanical interlock of the two armature plates with respect to each other is obtained.

Figure 7:
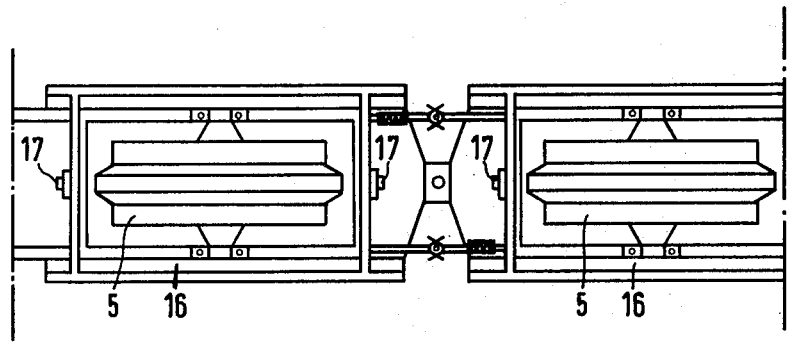
FIG. 7 illustrates an arrangement wherein a plurality of track wheels are arranged on the track rails.

As shown in FIG. 7, if several track wheels 5 are provided, it is advisable to couple the pivot shafts 17 of the rockers 16 with each other by means of suitable coupling means. The same positions of the rockers 16 is thereby always assumed. If several individual vehicles are run as a train, uniform positions of the rockers 16 for the entire train can be achieved for the same reason by coupling means in the form of fork-shaped couplings.

Actuating means 18 in the form of a relay with two positions can, for example, function to actuate the rocker 16. The one position, that is the normal position, is preferably secured by energy storage means such as a spring storage device 19 or the like if a unilaterally acting drive means is used. For safety reasons, this normal position always corresponds to the travel direction which has priority, for example, the straight travel along the main track.

According to an advantageous embodiment of the invention, guide rails 20 and 21 are arranged in the area of the switch 9 on the outer sides of the rails 2 and 3 respectively. Projections 22 and 23 are provided at the respective armature plates 14 and 15 on the vehicle are associated with the guide rails 20 and 21 in such a manner that the projection 23 and the guide rail 21 are mutually engaged during the passage through the switch. A change in the position of the rocker 16 while travelling through the switch is thereby mechanically prevented.

The association of the guide rails 20 and 21 with the respective projections 22 and 23 of the armature plates 14 and 15 is preferably configured so that a mechanical emergency guidance results in the event that the guidance afforded by the magnets 12 and 13 fails.

Figure 4:
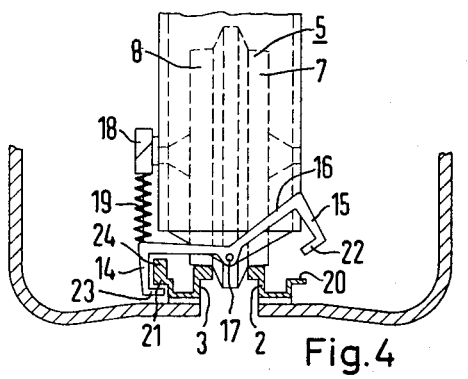
FIGS. 3 to 6 are transverse sections taken at lines III to VI respectively of FIG. 2, each of the views showing a portion of a vehicle of the conveyance.

In the region of the entrance into the switch 9, the guide rail 21 for the preferred direction is made longer than the guide rail 20 for the branch and is provided with an additional overlay 24 (FIG. 4). A neutral position in which the rocker 16 is engaged neither with the one nor the other of the guide rails 20 and 21, respectively, is thereby made impossible.

Figure 6:
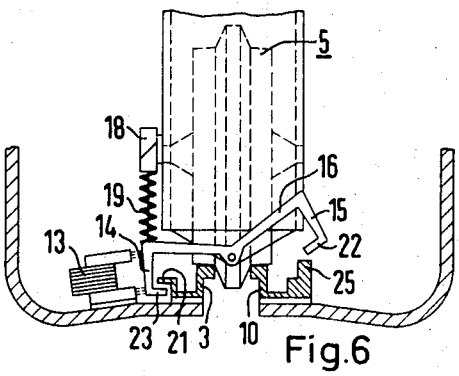

According to a further advantageous embodiment of the invention, a deflector 25 with inclined run-on surface is attached ahead of the entrance at the insides, which meet at an acute angle between the main line and the branch, ahead of the beginning of each of the guide rails 20 and 21 which are arranged on the outer sides respectively (FIGS. 2 and 6). If the switch 9 is entered at the acute angle as indicated by the arrowed dashed lines, this deflector moves the rocker 16 mechanically independent of its original position, so that it comes into engagement with the corresponding guide rail 20 or 21, respectively.

What is claimed is:

1. A switching arrangement for a conveyance bound to a guide structure such as a suspension railway or the like, the conveyance including a vehicle equipped with at least one track wheel having rolling surfaces mutually adjacent a center guide flange, and the guide structure having two rails conjointly defining a main track for accommodating respective ones of the rolling surfaces of the track wheel, the switch arrangement comprising a switch in the guide structure for branching at least one additional track into the main track; first and second armature members mounted on the vehicle so as to be selectively movable respectively into and out of respective regions; and first magnet means and second magnet means for generating magnetic fields in said regions respectively to individually coact with corresponding ones of said armature members in dependence upon the presence of said armature members in said regions respectively whereby magnetic forces are developed for directing the vehicle in its passage through said switch.

2. The switching arrangement of claim 1, said armature members being arranged on the vehicle so as to place said regions at respective sides of the plane of the track wheel, and said first and second magnet means being disposed with respect to the vehicle at the guide structure in the vicinity of said switch on the outer sides respectively of the rails of the main track so as to coact with corresponding ones of said armature members near the track wheel of the vehicle.

3. The switching arrangement of claim 2, said armature members being plate-like members.

4. The switching arrangement of claim 3 comprising guide rails at the respective outer sides of the rails defining the main track in the area of said switch, said armature plates having respective projections extending therefrom corresponding to respective ones of said guide rails, said projections being arranged on said plates so as to engage said rails in dependence upon the presence of said armature plates in said regions respectively.

5. The switching arrangement of claim 4 wherein one of the track rails extends along the main track and the other one of the track rails extends from the main track into the additional track, the guide rail at the outer side of the one track rail at the entrance area of said switch being larger than the guide rail at the outer side of the other one of the track rails at the entrance area of the switch, said longer guide rail having an overlay disposed thereon.

6. The switching arrangement of claim 5 wherein the additional track branches into the main track at said switch so that the rail of the main track mutually adjacent the rail of the branch track come together at a point in a V-like pattern, the arrangement comprising a rocker arm having a pivot shaft on the vehicle, said pivot shaft being parallel to the rails, said rocker arm being located so as to place said shaft in said plane of the track wheel, said track wheel plane being perpendicular to the plane of the rails at the mid location therebetween, said armature members being arranged on said rocker arm so as to place said members at respective sides of said track wheel plane, and deflectors disposed along respective ones of said last-mentioned mutually adjacent rails, said deflectors being disposed ahead of the respective guide rails corresponding to the track rails for contacting said rocker arm.

7. The switching arrangement of claim 2, said first and second magnet means being first and second magnets respectively, said armature members being mounted on the vehicle and said magnets being arranged on the outer sides respectively of the rails of the main track so as to locate said regions of said magnetic fields at an elevation coincident with the elevation of the surfaces of the rails of the main track.

8. The arrangement of claim 2 comprising a rocker arm having a pivot shaft, said rocker arm being pivotally mounted at said pivot shaft on the vehicle, said pivot shaft being parallel to the rails, said rocker arm being located so as to place said shaft in said plane of the track wheel, said track wheel plane being perpendicular to the plane of the rails at the mid location therebetween, said armature members being arranged on said rocker arm so as to place said members at respective sides of said track wheel plane.

9. The switching arrangement of claim 8 wherein a plurality of track wheels are arranged so as to be rollable on the rails, said first and second armature members and said rocker arm constituting an armature member assembly, and wherein said arrangement comprises a plurality of said armature member assemblys corresponding to the track wheels respectively, and coupling means for coupling the respective shafts of said assemblys together.

10. The switching arrangement of claim 9, said coupling means comprising a plurality of fork-like couplings for coupling said shafts with each other.

11. The switching arrangement of claim 8 comprising actuating means connected to said rocker arm for moving the same between two positions to alternately place said armature members in said regions respectively.

12. The switching arrangement of claim 11, said actuating means being electrical actuating means.

13. The switching arrangement of claim 11, said actuating means being mechanical actuating means.

14. The switching arrangement of claim 11, said actuating means being pneumatic actuating means.

15. The switching arrangement of claim 11, said actuating means being hydraulic actuating means.

16. The arrangement of claim 11 wherein said actuating means is a unilateral actuating means having an actuating member connected to said rocker arm and movable from a first position to a second position when said actuating means is actuated, and wherein the arrangement comprises energy storage means for removably holding said actuating member in one of said positions.

* * * * *